(12) United States Patent
Uehlin et al.

(10) Patent No.: US 12,480,829 B2
(45) Date of Patent: Nov. 25, 2025

(54) DIFFERENTIAL PRESSURE MEASURING SENSOR WITH OVERLOAD PROTECTION

(71) Applicant: Endress+Hauser SE+Co. KG, Maulburg (DE)

(72) Inventors: Thomas Uehlin, Schopfheim (DE); Igor Getman, Lörrach (DE); Benjamin Mack, Lörrach (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 233 days.

(21) Appl. No.: 18/256,440

(22) PCT Filed: Nov. 26, 2021

(86) PCT No.: PCT/EP2021/083114
§ 371 (c)(1),
(2) Date: Jun. 8, 2023

(87) PCT Pub. No.: WO2022/122411
PCT Pub. Date: Jun. 16, 2022

(65) Prior Publication Data
US 2024/0068896 A1    Feb. 29, 2024

(30) Foreign Application Priority Data
Dec. 10, 2020    (DE) .............. 10 2020 132 960.1

(51) Int. Cl.
*G01L 19/06*    (2006.01)
*G01L 13/02*    (2006.01)

(52) U.S. Cl.
CPC ........ *G01L 19/0618* (2013.01); *G01L 13/026* (2013.01)

(58) Field of Classification Search
CPC ..... G01L 19/00; G01L 19/06; G01L 19/0618; G01L 13/00; G01L 13/02; G01L 13/026
See application file for complete search history.

(56) References Cited

U.S. PATENT DOCUMENTS 4,539,850 A * 9/1985 Ziegler ................ G01L 13/025
                                                     73/706
10,656,039 B2   5/2020 Hershey et al.
(Continued)

FOREIGN PATENT DOCUMENTS

CN         110402378 A1    11/2019
DE         3222620 A1 *    8/1982 ............. G01L 13/02
(Continued)

*Primary Examiner* — Nguyen Q. Ha
(74) *Attorney, Agent, or Firm* — Kelly J. Smith; Endress+Hauser (USA) Holding, Inc.

(57) ABSTRACT

A differential pressure transducer with overload protection includes a measuring element body, two separating diaphragms, two overload diaphragms with radially variable material thickness h(r), a differential pressure transducer for converting a pressure difference into an electrical signal, and two hydraulic paths. The overload diaphragms are connected to the measuring element body to form overload chambers and the separating diaphragms are connected to the measuring element body to form separating diaphragm chambers in which one of the overload diaphragms are enclosed. The separating diaphragm chambers are hydraulically connected to the overload chambers below the other separating diaphragm chamber and to the differential pressure transducer via one of the hydraulic paths, which extend at least in sections through the measuring element body. The overload diaphragms have a base surface, which faces a mating surface in an overload chamber against which the overload diaphragms are pre-stressed in the operative state at pressure equilibrium.

16 Claims, 3 Drawing Sheets

(56) References Cited

U.S. PATENT DOCUMENTS

| | | | |
|---|---|---|---|
| 2014/0209220 | A1 | 7/2014 | Otomo et al. |
| 2016/0223420 | A1 | 8/2016 | Grimes et al. |
| 2018/0259414 | A1 | 9/2018 | Hershey et al. |
| 2018/0259415 | A1 | 9/2018 | Hershey et al. |

FOREIGN PATENT DOCUMENTS

| | | | |
|---|---|---|---|
| DE | 102014212766 | A1 | 1/2015 |
| EP | 636243 | B1 | 8/1997 |
| JP | 2003214969 | A | 7/2003 |
| JP | 2005207743 | A | 8/2005 |
| WO | 0003220 | A1 | 1/2000 |
| WO | 2011051089 | A1 | 5/2011 |

\* cited by examiner

DIFFERENTIAL PRESSURE MEASURING SENSOR WITH OVERLOAD PROTECTION

CROSS-REFERENCE TO RELATED APPLICATIONS

The present application is related to and claims the priority benefit of DPMA Patent Application No. 10 2020 132 960.1, filed on Dec. 10, 2020, and International Patent Application No. PCT/EP2021/083114, filed Nov. 26, 2021, the entire contents of which are incorporated herein by reference.

TECHNICAL FIELD

The present invention relates to a differential pressure transducer with overload protection. Generic differential pressure transducers usually comprise a measuring element body having a first pressure input port and a second pressure input port, from each of which a hydraulic path extends to a differential pressure transducer, in order to apply to the differential pressure transducer the first pressure and the second pressure, the difference of which is to be measured by the differential pressure transducer. In general, a differential pressure transducer has a deformation body, in particular a measuring diaphragm, to each side of which one of the two pressures can be applied, such that the measuring diaphragm has an elastic deformation that is dependent on the difference between the two pressures. The pressure inlet ports of the measuring element body are usually closed by flexible metallic separating diaphragms to form separating diaphragm chambers, each of which introduces a pressure applied to an outside of the separating diaphragm into the separating diaphragm chambers and the connected hydraulic path. With measuring elements with coplanar pressure inlet ports, the pressure inlets are located next to one another on a process connection surface of the measuring element body. Such measuring elements with coplanar pressure inputs are disclosed, for example, in EP 0 370 013 B1, EP 0 560 875 B1, EP 0 774 652 B2, EP 1 216 404 B1 and WO 2014/095417 A1. Differential pressure cells are usually optimized to measure small pressure differences p1–p2 at large static pressures p1, p2. In doing so, it is important to find the right balance between sensitivity and overload resistance. For example, the following can apply to the measuring range of the pressure difference |p1–p2|

$$2|p1-p2|/(p1+p2)<1\%.$$

BACKGROUND

If one of the pressures p1, p2 is dropped in a process facility, the measuring cell is loaded with 100 times the measuring range, which could destroy the pressure transducer, which is why it must be protected. A proven protection is based on connecting an overload diaphragm, which can be deflected on both sides, in parallel to the measuring cell. Such an overload diaphragm has a sufficiently large hydraulic capacity to absorb the volume of a transfer fluid in a hydraulic path in the event of a one-sided overload to such an extent that the separating diaphragm of such hydraulic path comes into contact with a diaphragm bed, such that a further increase in the differential pressure acting on the differential pressure cell is reliably prevented. Examples of differential pressure transducers with overload diaphragms acting on both sides are disclosed in EP 1 299 701 B1, DE 10 2006 040 325 A1, DE 10 2006 057 828 A1, WO 2014/095417 A1 and U.S. Pat. No. 10,627,302 B2.

As an alternative to an overload diaphragm that can deflect on both sides, two oppositely pre-stressed overload diaphragms are described, each responding to a single-sided overload, as described in DD 279 065 A1, DD 287 328 A5, DD 290 716 A5, DE 32 22 620 A1 and U.S. Pat. No. 10,656,039 B2. In order to implement this principle reliably, it must be ensured that the overload diaphragm is deflected as far as possible only at pressure differences outside the measuring range, wherein the required volume stroke of the overload diaphragm then corresponds to the entire volume of the separating diaphragm chamber, wherein at most negligible plastic deformations may occur due to the required deflection. Furthermore, the overload diaphragm is to support the separating diaphragm in the event of a one-sided overload on the high-pressure side if all oil has been displaced from the high-pressure side separating diaphragm chamber in order to prevent plastic deformation of the separating diaphragm. For this purpose, the overload diaphragm must have a contour corresponding to the contour of the separating diaphragm, which is prepared, for example, by stamping an overload diaphragm blank with a die, as may be the case for the overload diaphragms according to U.S. Pat. No. 10,656,039 B2. According to U.S. Pat. No. 10,656,039 B2, the resulting shaft contour of the overload diaphragm should also have a larger axial stroke than a coaxial shaft contour on the surface of the measuring element body, against which the overload diaphragm rests in sections. Firstly, this requires a very complex manufacturing process and secondly, the different requirements for the overload diaphragm are hardly compatible with one another, in particular if the differential pressure transducer is to be so compact that it is compatible with the coplanar process connection of the differential pressure transducer 3051 made by Rosemount.

SUMMARY

It is therefore the object of the present invention to provide a differential pressure transducer that provides reliable overload protection.

The differential pressure transducer with overload protection according to the invention, comprises: a measuring element body; a first separating diaphragm; a second separating diaphragm; a first overload diaphragm; a second overload diaphragm; a differential pressure transducer for converting a pressure difference into an electrical signal; a first hydraulic path; and a second hydraulic path; wherein the first overload diaphragm is connected to the measuring element body to form a first overload chamber with variable volume along a circumferential first overload diaphragm edge; wherein the second overload diaphragm is connected to the measuring element body to form a second overload chamber with variable volume along a circumferential second overload diaphragm edge; wherein the first separating diaphragm is connected to the measuring element body to form a first separating diaphragm chamber along a circumferential first separating diaphragm edge, wherein the first overload diaphragm is enclosed between the measuring element body and the first separating diaphragm; wherein the second separating diaphragm is connected to the measuring element body to form a second separating diaphragm chamber along a circumferential second separating diaphragm edge, wherein the second overload diaphragm is enclosed between the measuring element body and the second separating diaphragm; wherein the first separating diaphragm chamber is hydraulically connected to the second overload chamber via the first hydraulic path, which extends at least in sections through the measuring element body; wherein the second separating diaphragm chamber is hydraulically connected to the first overload chamber via the second hydraulic path, which extends at least in sections through the measuring element body; wherein the differential pressure transducer is hydraulically connected to the first separating diaphragm chamber and the second separating diaphragm chamber; wherein the first overload diaphragm has a first base surface, which faces a first mating surface in the first overload chamber; wherein the second overload diaphragm has a second base surface, which faces a second mating surface in the second overload chamber; wherein the first overload diaphragm is pre-stressed against the first mating surface in the operable state at pressure equilibrium, that is, a pressure difference of zero, such that the first base surface rests against the first mating surface at least in sections; wherein the second overload diaphragm is pre-stressed against the second mating surface, such that the second base surface rests against the second mating surface at least in sections; wherein the first overload diaphragm has a radially variable first material thickness h(r); and wherein the second overload diaphragm has a radially variable first material thickness h(r).

In a further development of the invention, the first overload diaphragm has a diaphragm bed surface facing the separating diaphragm with a contour k(r) prepared by machining or forming. Such type of preparation grants more degrees of freedom than the usual stamping of a diaphragm blank on a die, although by its nature the axial distance between local maxima and adjacent local minima is limited by the original thickness of the material of the overload diaphragm.

In a further development of the invention, the material thickness h(r) of the first overload diaphragm has local maxima and minima in a radial range 0<r<0.9 R, wherein a difference between a local maximum and a local minimum of the material thickness of the overload diaphragm is not less than two, in particular not less than three material thicknesses of the first separating diaphragm, and/or wherein an amount of a difference of a local maximum of the material thickness of the overload diaphragm and a material thickness of the overload diaphragm averaged over the radial range along the radius is not less than one material thickness, in particular not less than three half material thicknesses of the separating diaphragm.

In a further development of the invention, the material thickness h(r) of the overload diaphragm has not less than 4, in particular not less than 6 local maxima.

In a further development of the invention, the first overload diaphragm has a first base surface facing the first mating surface and a first diaphragm bed surface facing the first separating diaphragm, wherein the first diaphragm bed surface has a first diaphragm bed contour with an axial coordinate k(r) in order to support the first separating diaphragm in the event of a one-sided overload, wherein in the operable state at pressure equilibrium, that is, a pressure difference of zero, for the second derivation of the axial coordinate k(r) of the first diaphragm bed contour according to the radius $d^2k/dr^2$ and the second derivation of the first material thickness h(r) of the first overload diaphragm according to the radius $d^2h/dz^2$, the following applies:

$$\frac{\int_0^{g \cdot R} \frac{d^2k(r)}{dr^2} \cdot \frac{d^2h(r)}{dr^2} dr}{\int_0^{g \cdot R} \left(\frac{d^2h(r)}{dr^2}\right)^2 dr} = T$$

where g is a factor defining a bound for the integration, where $0.9 \leq g \leq 1$, where T is a dimensionless characteristic number that is not less than 0.9 and in particular not less than 0.95.

In a further development of the invention, the first base surface has an axial coordinate b(r), wherein in the operable state at pressure equilibrium, that is, a pressure difference of zero, for the second derivation of the axial coordinate b(r) according to the radius $d^2b/dr^2$, the following applies:

$$\frac{\int_0^{g \cdot R} \frac{d^2k(r)}{dr^2} \cdot \frac{d^2b(r)}{dr^2} dr}{\int_0^{g \cdot R} \left(\frac{d^2h(r)}{dr^2}\right)^2 dr} = U$$

where U is a dimensionless characteristic number that is not more than 0.2, for example not more than 0.1 and in particular not more than 0.05.

In a further development of the invention, the first overload diaphragm has a first central region (C) the outer radius r of which is not less than 30%, in particular not less than 40%, of the radius R of the overload diaphragm, wherein the central region (C) is adjoined by a first transition region (B), which extends over not less than 20%, for example not less than 30% of the radius (R) of the first overload diaphragm, wherein the axial coordinate of the base surface b(r) in the uninstalled equilibrium state of the first overload diaphragm in the first transition region (B) has a larger mean dimensionless slope $R/h_{max}(B) \cdot db(r)/dr$ than the first central region, wherein $h_{max}(B)$ is the maximum thickness of the overload diaphragm in the transition region (B).

In a further development of the invention, a dimensionless mean slope $R/h_{max}(B) \cdot db(r)/dr$ of the first transition region determined with linear regression in the uninstalled equilibrium state of the first overload diaphragm is not less than 1.5, in particular not less than 2.

In a further development of the invention, the first transition region (B) has a frustoconical shape in the uninstalled equilibrium state of the first overload diaphragm.

In a further development of the invention, a first edge region (A) adjoins the first transition region radially outwardly, wherein the first edge region has, in the uninstalled equilibrium state of the first overload diaphragm, a mean slope 1/(h R) dz(r)/dr that is no more than one quarter, for example no more than one eighth, of the mean slope of the transition region.

In a further development of the invention, the first base surface in the uninstalled state of the first overload diaphragm has an equilibrium shape for the radius-dependent axial coordinate g(r) of which there exists an equilibrium approximation function GN(r) determined with linear regression; wherein the first base surface in the installed operable state of the overload diaphragm has a shape for the radius-dependent axial coordinate b(r) of which there exists an operational approximation function BN(r) determined with linear regression; wherein the slope of the operational approximation function BN(r) is not more than three quarters, and in particular not more than half, of the slope of the equilibrium approximation function GN(r).

In a further development of the invention, a differential pressure measuring range is specified for the differential pressure transducer, wherein the first overload diaphragm is pre-stressed against the mating surface to such an extent that, at a temperature of 300 K and a differential pressure corresponding to the maximum value of the differential pressure measuring range, a volume stroke of the first overload diaphragm corresponds to no more than 10%, in particular no more than 5%, of the oil volume contained in the second separating diaphragm chamber at pressure equilibrium and normal pressure.

In a further development of the invention, the first overload diaphragm has a steel, in particular a cold-rolled steel of the grade 1.4310 or 1.8159.

In a further development of the invention, the first overload diaphragm is obtainable by a method comprising tempering, that is, annealing and quenching.

In a further development of the invention, the first overload diaphragm has an effective diameter of no more than 27 mm, and in particular no more than 25 mm. The effective diameter limits the deflectable range of the overload diaphragm. It is defined by an inner edge of a joint with which the overload diaphragm is fastened to the mating body.

In a further development of the invention, the second overload diaphragm is substantially identical in construction to the first overload diaphragm.

In a further development of the invention, the mating surfaces each extend substantially parallel to the base surfaces of the overload diaphragms.

In a further development of the invention, the volumes enclosed between the mating surfaces and the base surfaces in the operable state at pressure equilibrium, that is, a pressure difference of zero, are in each case no more than 20 μl, in particular no more than 10 μl.

In a further development of the invention, the measuring element body has a process connection surface with a first pressure port and a second pressure port, wherein the first separating diaphragm can be subjected to a first media pressure through the first pressure port, and wherein the second separating diaphragm can be subjected to a second media pressure through the second pressure port, and wherein the two separating diaphragms are arranged in manner coplanar relative to one another.

In a further development of the invention, the measuring element body has a first diaphragm support surface and a second diaphragm support surface, wherein the first separating diaphragm is arranged on the first diaphragm support surface and the second separating diaphragm 240 is arranged on the second diaphragm support surface, wherein the two diaphragm support surfaces face away from one another.

BRIEF DESCRIPTION OF THE DRAWINGS

The invention is explained in more detail below with reference to the exemplary embodiments shown in the drawings. In the figures.

DETAILED DESCRIPTION

Figure 1:
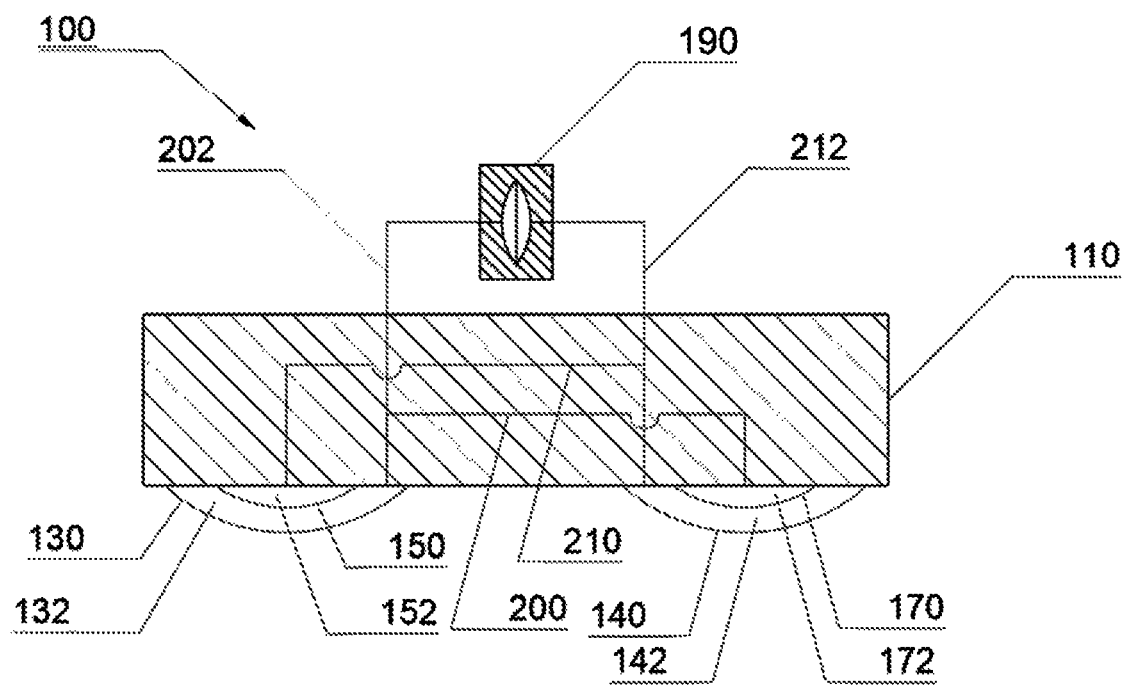
FIG. 1 shows a schematic illustration of the operating principle of the differential pressure transducer according to the present disclosure.

The schematic illustration in FIG. 1 shows how the various components of an exemplary embodiment of a transducer according to the invention are hydraulically coupled to develop their effect. The differential pressure transducer 100 has a metallic measuring element body 110 to which a first separating diaphragm 130 and a second separating diaphragm 140 are attached with a circumferential joint to form a first and a second separating diaphragm chamber 132, 142, respectively. A first and second overload diaphragms 150, 170, respectively, which are fastened to the measuring element body 110 with a circumferential joint to form first and second overload chambers 152, 172, respectively, are arranged within each of the separating diaphragm chambers 132, 142. The two separating diaphragms 130, 140 have a steel, in particular a stainless steel or spring steel in a material thickness of less than 100 μm, for example 30 μm, wherein a contour is imprinted on the diaphragms in order to improve the linearity of the relationship of a pressure difference between the two separating diaphragms and the resulting volume stroke of the separating diaphragm. The diameter of the separating diaphragms can be, for example, 25 to 30 mm. As a result, the separating diaphragms are very soft and may be deflected to both sides with small pressure differences depending on their sign.

The two overload diaphragms 150, 170 have a slightly smaller diameter than the separating diaphragms 130, 140, wherein the effective diameter can be 22 to 26 mm in particular. They also have a greater starting material thickness, depending on the measuring range, for example 200 to 1000 μm, in the example 700 μm, such that the overload diaphragms 150, 170 are many times stiffer than the separating diaphragms 130, 140, in particular more than 1000 times stiffer. In addition, the overload diaphragms 150, 170, are pre-stressed against the measuring element body 110, such that, firstly, deflection toward the measuring element body 110 is not possible and, secondly, deflection away from the measuring element body 110 does not occur until the pressure difference between the overload chamber and the adjacent separating diaphragm chamber is sufficient to overcome the pre-stressing of the overload diaphragm. The overload diaphragms 150, 170 in each case have a contoured diaphragm bed on their side facing a separating diaphragm 130, 140, in order to support the separating diaphragm 130, 140 in the event of overload.

The separating diaphragm chambers 132, 142 and the overload chambers 152, 172 are coupled by hydraulic paths, as follows. From the first separating diaphragm chamber 132, a first hydraulic path 200 comprising bores at least in section in the measuring element body 110 extends to the second overload chamber 172. Accordingly, from the second separating diaphragm chamber 142, a second hydraulic path 210 comprising bores at least in sections in the measuring element body 110 extends to the first overload chamber 152.

The differential pressure transducer 100 further comprises a differential pressure transducer 190, for example a (piezo-) resistive transducer or a capacitive transducer, connected to the first hydraulic path via first and second capillary lines 202, 212 to the two hydraulic paths 202, 212, in order to record a pressure difference between the two hydraulic paths and provide a primary electrical signal representing that pressure difference.

For the differential pressure transducer 190, a measuring range is defined, which is usually less than a maximum differential pressure that the differential pressure transducer 190 can withstand. The pre-stressing of the overload diaphragms 150, 170 is selected in such a way that they are deflected only negligibly in the event of pressure differences within the measuring range. However, if a pressure difference exceeds the measuring range, the deflection of the overload diaphragm on the lower pressure side starts to absorb volume of the transfer fluid of the high pressure side separating diaphragm chamber, such that the separating diaphragm on the high pressure side comes into contact with the diaphragm bed on the high pressure side, preventing a further increase in the pressure difference at the differential pressure transducer. Thereby, the overload diaphragm is dimensioned such that this state occurs before the strength limits of the differential pressure transducer are reached.

In the drawing, the separating diaphragms 130, 140 and overload diaphragms 150, 170 are represented by circular arcs. This illustration has nothing to do with their actual shape, since FIG. 1 is concerned only with the functional arrangement of the components of the differential pressure transducer relative to one another.

Figure 2A:
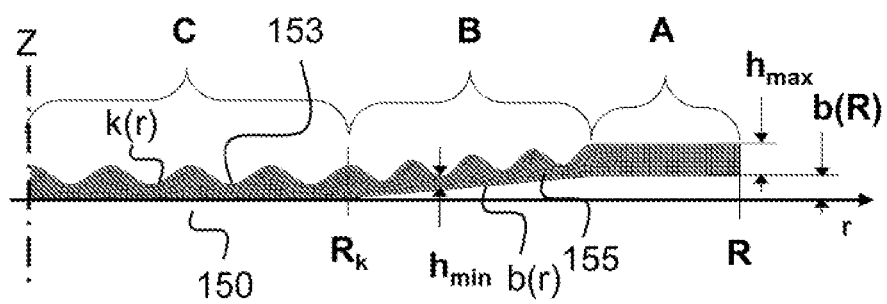
FIG. 2a shows a longitudinal section of an overload diaphragm in the equilibrium position.

FIGS. 2a to 2d show an exemplary embodiment of an overload diaphragm 150 of a differential pressure transducer according to the invention in various installation and operating situations. In FIG. 2a, the free overload diaphragm 150 is shown in the equilibrium state, that is, free from external forces and moments. The overload diaphragm is substantially rotationally symmetrical about the Z axis. It has a radius R of between 11 mm and 14 mm and a maximum material thickness $h_{max}$ of 0.6 mm to 0.8 mm. The overload diaphragm 150 has a planar central region C and a planar edge region A, wherein a transition region B extends between the two, in particular one that is frustoconical at least in sections. Therefore, the overload diaphragm 150 has a base surface 150 the axial coordinate b(r) of which is constant in the equilibrium state in the central region, for example zero, and which increases uniformly in the transition region B to a value that is approximately 60% to 80% of the maximum material thickness $h_{max}$ of the overload diaphragm 150. Such value for b(r) is then constant in the edge region A and thus also corresponds to the value b(R) at the radius R. The transition region B begins at a radius $R_k$, which is approximately half of the radius R. The upper side of the overload diaphragm facing away from the base surface 155 has a diaphragm bed with a (here, wave-shaped) contour k(r), which is prepared by machining or forming. The depth of the contour here is up to slightly more than half the maximum material thickness $h_{max}$ of the overload diaphragm 150. Accordingly, the minimum material thickness $h_{min}$ of the overload diaphragm 150 is slightly less than the maximum material thickness MAX. The material thickness h(r) as a function of the radius arises from the difference between the contour k(r) and the axial coordinate of the base surface b(r), that is, h(r)=k(r)−b(r). It can be seen that the material thickness h(r) is influenced by the contour k(r) and practically not by b(r). In principle, the elastic characteristic of the diaphragm is thus specified by the course of the coordinate b(r) of the base surface, wherein the contour k(r), which is designed independently of this, serves on the one hand to form the diaphragm bed and on the other hand to model the stresses and stiffness of the overload diaphragm.

Figure 2B:
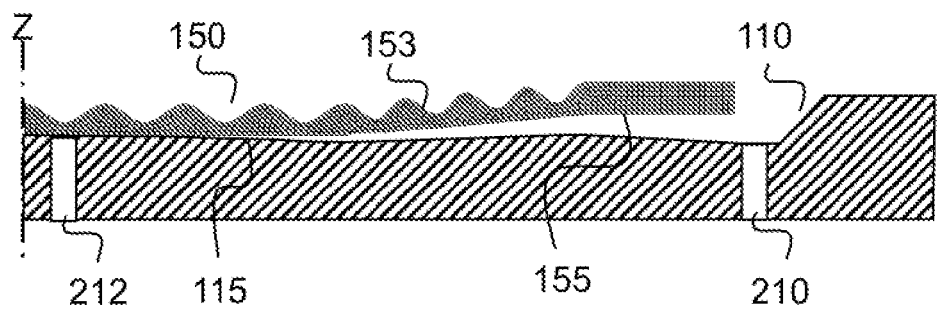
FIG. 2b shows a longitudinal section of an overload diaphragm positioned above the mating body in the equilibrium position.

FIG. 2b shows the overload diaphragm 150 over the mating surface 115 of a measuring element body 110. Here, it is substantially important that the mating surface is not planar, but has a maximum in the center and slopes outwardly. Such course of the mating surface corresponds approximately to a bending line of the overload diaphragm 150 if the overload diaphragm 150 rests on a planar base and is clamped against the planar base with the base surface in the edge region. In fact, a pressure acts on the base only in the vicinity of the radius $R_k$. If the center of the mating surface 115 thus follows exactly the bending line of the base surface during the deformation described above, the overload diaphragm is not yet supported. Only a further increase in the center of the mating surface 115 relieves the overload diaphragm in the vicinity of the radius $R_k$. Regardless of whether this relief is desirable, it is desirable for the mating surface 115 to approach the bending line b(r), in order to minimize the quantity of transfer fluid in the overload chamber. The mating surface 115 is designed following these considerations.

Figure 2C:
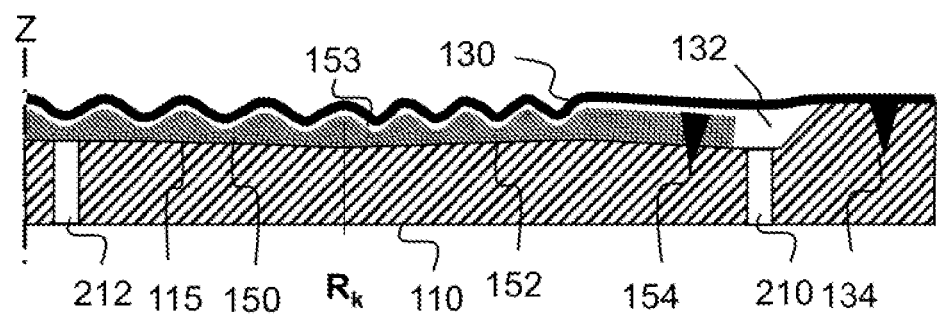
FIG. 2c shows a longitudinal section of a separating diaphragm chamber and an overload chamber in the operable state at pressure equilibrium, that is, a pressure difference of zero.

FIG. 2c shows a section of the differential pressure transducer (100) according to the invention in the ready-to-operate state at pressure equilibrium. The overload diaphragm 150 is stretched over a mating surface 115 formed according to the above considerations and is fastened in its edge region to the measuring element body 100 by a circumferential weld seam 154, such that an overload chamber 152 is formed between the overload diaphragm 150 and the measuring element body 100, which however is compressed at pressure equilibrium by the pre-stressing of the overload diaphragm 150 down to a residual volume not shown here. A separating diaphragm 130 is arranged above the overload diaphragm 150 and is fixed to the measuring element body 110 by a circumferential weld seam 134, wherein a separating diaphragm chamber 132 is formed between the measuring element body 110 and the separating diaphragm 130. The separating diaphragm 130 is imprinted on the diaphragm bed 153 of the overload diaphragm. The separating diaphragm chamber 132 is filled with a hydraulic transfer fluid and communicates via a first hydraulic path 210 with a second overload chamber 172, which is identical in construction to the first overload chamber 152. The first overload chamber 152 communicates via a second hydraulic path 212 with a second separating diaphragm chamber 142, which is identical in construction to the first separating diaphragm chamber 132.

Figure 2D:
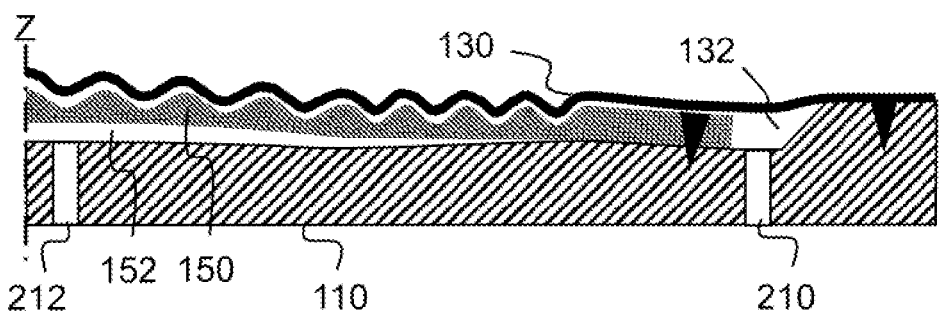
FIG. 2d shows a longitudinal section of a separating diaphragm chamber and an overload chamber in the event of overload.

Finally, FIG. 2d shows the event of overload if the difference between the pressure in the second separating diaphragm chamber 142 or in the second hydraulic path 212 and the pressure in the first separating diaphragm chamber 132 exceeds a limit value outside a measuring range specified for the differential pressure transducer. In this case, the first overload diaphragm is deflected and takes up a volume of transfer fluid displaced from the second separating diaphragm chamber 142, such that the second separating diaphragm comes into contact with the second overload diaphragm.

To facilitate reliable deflection of the overload diaphragm 150, it is advantageous if the mating surface 115 only approximately follows the bending line of the base surface 155 at pressure equilibrium, such that a residual amount of transfer fluid still remains in the overload chamber 152 in order to transmit the pressure to the overload diaphragm 150. For support, channels in the form of grooves may be prepared in the mating surface and/or the base surface in order to facilitate distribution of the transfer fluid under the overload diaphragm.

Figure 3A:
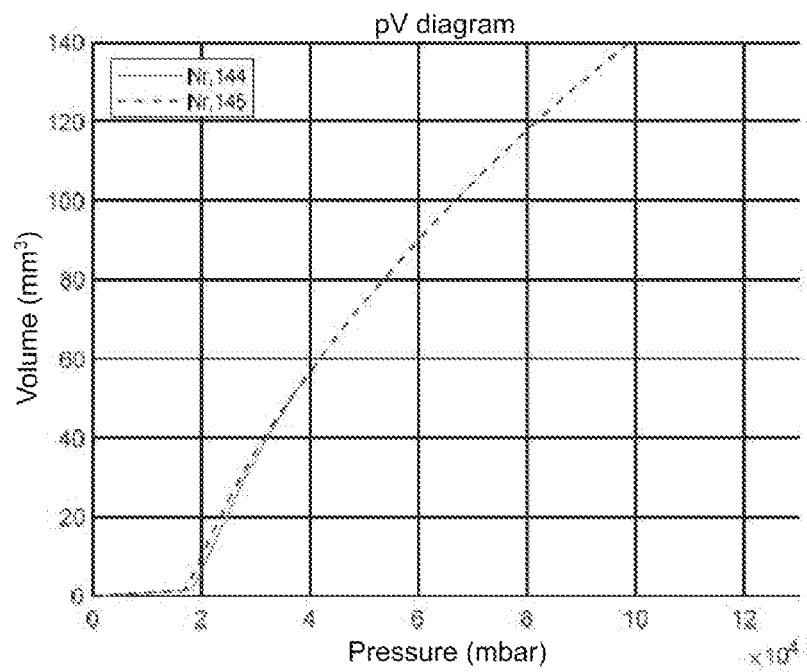
FIG. 3a shows a diagram of the volume stroke of the overload diaphragm as a function of a pressure difference across the overload diaphragm.
Figure 3B:
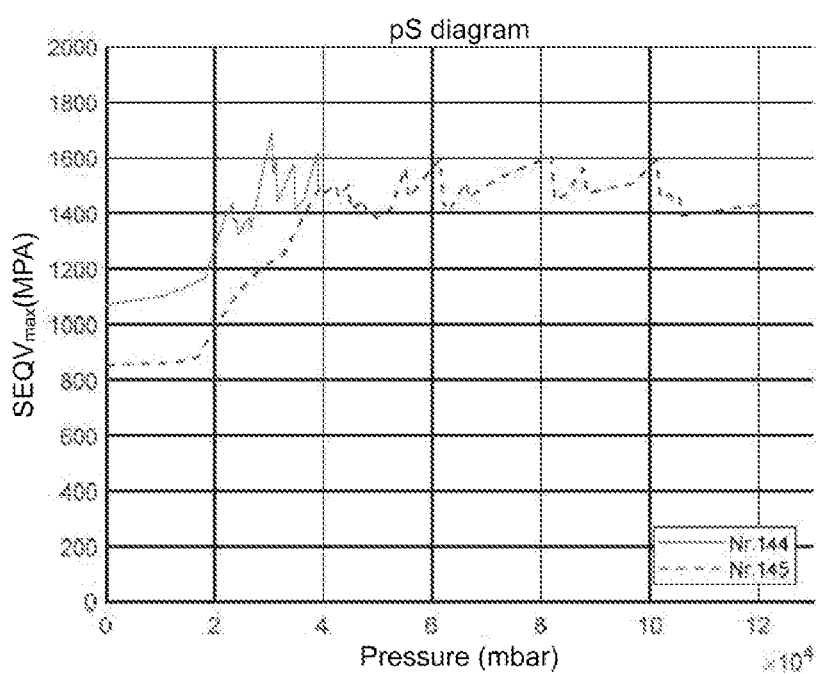
FIG. 3b shows a diagram of the maximum mechanical stresses of the overload diaphragm as a function of a pressure difference across the overload diaphragm.

The diagrams in FIGS. 3a and 3b show results of FEM calculations for the overload diaphragm from FIGS. 2a to 2d. Thereby, the overload diaphragm features a spring steel of grade 1.8159 with an experimentally determined modulus of elasticity of 195 GPa and an $R_{p02}$ of 1.3 GPa. The starting material thickness $h_{max}$ was set at 700 µm and the effective diameter of the overload diaphragm was set at 23.6 mm. FIG. 3a shows the volume stroke of the overload diaphragm as a function of a differential pressure between the two sides of the overload diaphragm. Accordingly, the volume stroke is practically negligible up to a differential pressure of approximately 1.8 MPa, and then increases abruptly in the event of overload, reaching approximately 55 µl at approximately 3.9 MPa. This is sufficient to absorb the full volume of transfer fluid from the separating diaphragm chamber connected to the overload chamber, in order to thus prevent a further increase in differential pressure and protect the differential pressure transducer. It has been shown that it is advantageous to apply such a one-sided overload pressure to the overload diaphragm one time before the differential pressure transducer is put into operation, for example when the measuring element is filled with transfer fluid, to bring about the maximum required volume stroke. This leads to slight modifications of the characteristic curve of the volume stroke as a function of the differential pressure. Thus, the overload diaphragm is marginally plastically deformed. The solid characteristic curve in FIG. 3a represents such first deflection of the overload diaphragm, while the dashed characteristic curve applies to all further deflections. The effect of such first deflection is clearly shown in FIG. 3b, which shows results of FEM calculations on the maximum Von Mises stresses in the overload diaphragm as a function of differential pressure. In turn, the solid line applies to the first deflection of the overload diaphragm, while the dashed line describes all further deflections. At the first deflection, stress peaks that exceed $R_{p02}$ for the material of the overload diaphragm can be seen. This results in minimal plastic deformation of the overload diaphragm upon initial deflection. However, with repeated deflections, the stress peaks are largely eliminated, which is why a constant relationship between volume stroke and differential pressure is thus achieved. This allows the differential pressure transducer to be reliably protected against overloads on one side.

The invention claimed is:

1. A differential pressure transducer with overload protection, comprising:
a measuring element body;
a first separating diaphragm;
a second separating diaphragm;
a first overload diaphragm;
a second overload diaphragm;
a differential pressure transducer for converting a pressure difference into an electrical signal;
a first hydraulic path; and
a second hydraulic path;
wherein the first overload diaphragm is connected to the measuring element body to form a first overload chamber with variable volume along a circumferential first overload diaphragm edge;
wherein the second overload diaphragm is connected to the measuring element body to form a second overload chamber with variable volume along a circumferential second overload diaphragm edge;
wherein the first separating diaphragm is connected to the measuring element body to form a first separating diaphragm chamber along a circumferential first separating diaphragm edge;
wherein the first overload diaphragm is enclosed between the measuring element body and the first separating diaphragm;
wherein the second separating diaphragm is connected to the measuring element body to form a second separating diaphragm chamber along a circumferential second separating diaphragm edge,
wherein the second overload diaphragm is enclosed between the measuring element body and the second separating diaphragm;
wherein the first separating diaphragm chamber is hydraulically connected to the second overload chamber via the first hydraulic path, which extends at least in sections through the measuring element body;
wherein the second separating diaphragm chamber is hydraulically connected to the first overload chamber via the second hydraulic path, which extends at least in sections through the measuring element body;
wherein the differential pressure transducer is hydraulically connected to the first separating diaphragm chamber and the second separating diaphragm chamber;
wherein the first overload diaphragm has a first base surface, which faces a first mating surface in the first overload chamber;
wherein the second overload diaphragm has a second base surface, which faces a second mating surface in the second overload chamber;
wherein the first overload diaphragm is pre-stressed against the first mating surface in the operable state at pressure equilibrium, such that the first base surface rests against the first mating surface at least in sections;
wherein the second overload diaphragm is pre-stressed against the second mating surface, such that the second base surface rests against the second mating surface at least in sections;
wherein the first overload diaphragm has a radially variable first material thickness h(r); and
wherein the second overload diaphragm has a radially variable first material thickness h(r).

2. The differential pressure transducer according to claim 1, wherein the first overload diaphragm has a diaphragm bed surface facing the separating diaphragm with a contour k(r) prepared by machining or forming.

3. The differential pressure transducer according to claim 1, wherein the material thickness h(r) of the first overload diaphragm has local extrema in a radial range 0<r<0.9 R, wherein a difference between a local maximum and a local minimum of the material thickness of the overload diaphragm is not less than two, and/or wherein an amount of a difference of a local maximum of the material thickness of the overload diaphragm and a material thickness of the overload diaphragm averaged over the radial range along the radius is not less than one material thickness.

4. The differential pressure transducer according to claim 3, wherein the material thickness h(r) of the overload diaphragm has not less than 4.

5. The differential pressure transducer according to claim 1, wherein the first overload diaphragm has a first base surface facing the first mating surface and a first diaphragm bed surface facing the first separating diaphragm, wherein the first diaphragm bed surface has a first diaphragm bed contour with an axial coordinate k(r) in order to support the first separating diaphragm in the event of a one-sided overload, wherein in the operable state at pressure equilibrium, for the second derivation of the axial coordinate k(r) of the first diaphragm bed contour according to $d^2k/dr^2$ and the second derivation of the first material thickness h(r) of the first overload diaphragm according to the radius $d^2h/dr^2$, the following applies:

$$\frac{\int_0^{g \cdot R} \frac{d^2k(r)}{dr^2} \cdot \frac{d^2h(r)}{dr^2} dr}{\int_0^{g \cdot R} \left(\frac{d^2h(r)}{dr^2}\right)^2 dr} = T$$

where g is a factor defining a bound for the integration, where $0.9 \leq g \leq 1$, where T is a dimensionless characteristic number that is not less than 0.9.

6. The differential pressure transducer, according to claim 5, wherein the first base surface has an axial coordinate b(r), wherein, when the first overload diaphragm rests against the mating surface, for the second derivation of the axial coordinate b(r) of the base surface according to the radius $d^2b/dr^2$ and the second derivation of the first material thickness h(r) of the first overload diaphragm is according to the radius $d^2h/dr^2$, the following applies:

$$\frac{\int_0^{g \cdot R} \frac{d^2k(r)}{dr^2} \cdot \frac{d^2b(r)}{dr^2} dr}{\int_0^{g \cdot R} \left(\frac{d^2h(r)}{dr^2}\right)^2 dr} = U$$

where U is a dimensionless characteristic number that is not more than 0.1.

7. The differential pressure transducer according to claim 1, wherein the material thickness h(r) of the first overload diaphragm has local extrema in a radial range 0<r<0.9 R, wherein a difference between a local maximum and a local minimum of the material thickness of the overload diaphragm is not less than two material thicknesses of the first separating diaphragm, and/or wherein an amount of a difference of a local maximum of the material thickness of the overload diaphragm and a material thickness of the overload diaphragm averaged over the radial range along the radius is not less than one material thickness of the separating diaphragm.

8. The differential pressure transducer according to claim 1, wherein the first overload diaphragm has a first central region (C) the outer radius r of which is not less than 30% of the radius R of the overload diaphragm, wherein the central region (C) is adjoined by a first transition region (B) which extends over not less than 20% of the radius (R) of the first overload diaphragm, wherein the axial coordinate of the base surface b(r) in the uninstalled equilibrium state of the first overload diaphragm in the first transition region (B) has a larger mean dimensionless slope $R/h_{max}(B) \cdot db(r)/dr$ than the first central region, wherein $h_{max}(B)$ is the maximum thickness of the overload diaphragm in the transition region (B).

9. The differential pressure transducer according to claim 8, wherein a dimensionless mean slope $R/h_{max}(B) \cdot db(r)/dr$ of the first transition region determined with linear regression in the uninstalled equilibrium state of the first overload diaphragm is not less than 1.5.

10. The differential pressure transducer according to claim 8, wherein the first transition region (B) has a frustoconical shape in the uninstalled equilibrium state of the first overload diaphragm.

11. The differential pressure transducer according to claim 7, wherein a first edge region (A) adjoins the first transition region radially outwardly, wherein the first edge region has, in the uninstalled equilibrium state of the first overload diaphragm a mean slope 1/(hR)dz(r)/dr that is no more than one quarter of the mean slope of the transition region.

12. The differential pressure transducer according to claim 1, wherein the first base surface in the uninstalled state of the first overload diaphragm has an equilibrium shape for the radius-dependent axial coordinate g(r) of which there exists an equilibrium approximation function GN(r) determined by linear regression;

wherein the first base surface in the installed operable state of the overload diaphragm has a shape for the radius-dependent axial coordinate b(r) of which there exists an operational approximation function BN(r) determined with linear regression;

wherein the slope of the operational approximation function BN(r) is not more than three quarters of the slope of the equilibrium approximation function GN(r).

13. The differential pressure transducer according to claim 1, wherein a differential pressure measuring range is specified for the differential pressure transducer, wherein the first overload diaphragm is pre-stressed against the mating surface to such an extent that, at a temperature of 300 K and a differential pressure corresponding to the maximum value of the differential pressure measuring range, a volume stroke of the first overload diaphragm corresponds to no more than 10% of the oil volume contained in the second separating diaphragm chamber at pressure equilibrium and normal pressure.

14. The differential pressure transducer according to claim 1, wherein the first overload diaphragm has a steel of the grade 1.4310 or 1.8159.

15. The differential pressure transducer according to claim 1, wherein the first overload diaphragm has been tempered.

16. The differential pressure transducer according to claim 1, wherein the second overload diaphragm is substantially identical in construction to the first overload diaphragm.

\* \* \* \* \*